United States Patent [19]
Youngers

[11] 3,768,678
[45] Oct. 30, 1973

[54] LOADER AND UNLOADER APPARATUS

[76] Inventor: Gerald P. Youngers, R.R. 1, Viola, Kans. 67149

[22] Filed: Dec. 6, 1971

[21] Appl. No.: 205,025

[52] U.S. Cl. .................................. 214/517, 254/45
[51] Int. Cl. ............................................. B60p 1/64
[58] Field of Search.................... 214/515, 516, 517; 254/45

[56] References Cited
UNITED STATES PATENTS

| 3,684,112 | 8/1972 | Wijers | 214/517 |
| 3,221,913 | 12/1965 | Chamberlain | 214/517 |
| 1,341,197 | 5/1920 | Reynolds | 214/516 X |
| 3,217,914 | 11/1965 | Aldropp | 214/516 |
| 3,521,776 | 9/1970 | Talbot | 214/516 |
| 3,262,591 | 7/1966 | Aldropp | 214/517 |

Primary Examiner—Albert J. Makay
Attorney—John J. Widdowson

[57] ABSTRACT

A loading and unloading apparatus has a first frame attachable to the underneath side of such as a camper. Another frame is secured to a vehicle bed to guide the camper into a loaded position thereon. A winch apparatus mountable on the rear of the vehicle bed has a winch block which engages a rope, calbe or chain which is secured to the first frame fore and aft. In operation the winch moves the rope, cable or chain thereby moving the camper relative to the vehicle bed which moves it into a loaded position on the truck bed, or in a reverse operation removes it from the vehicle bed to an unloaded position.

6 Claims, 8 Drawing Figures

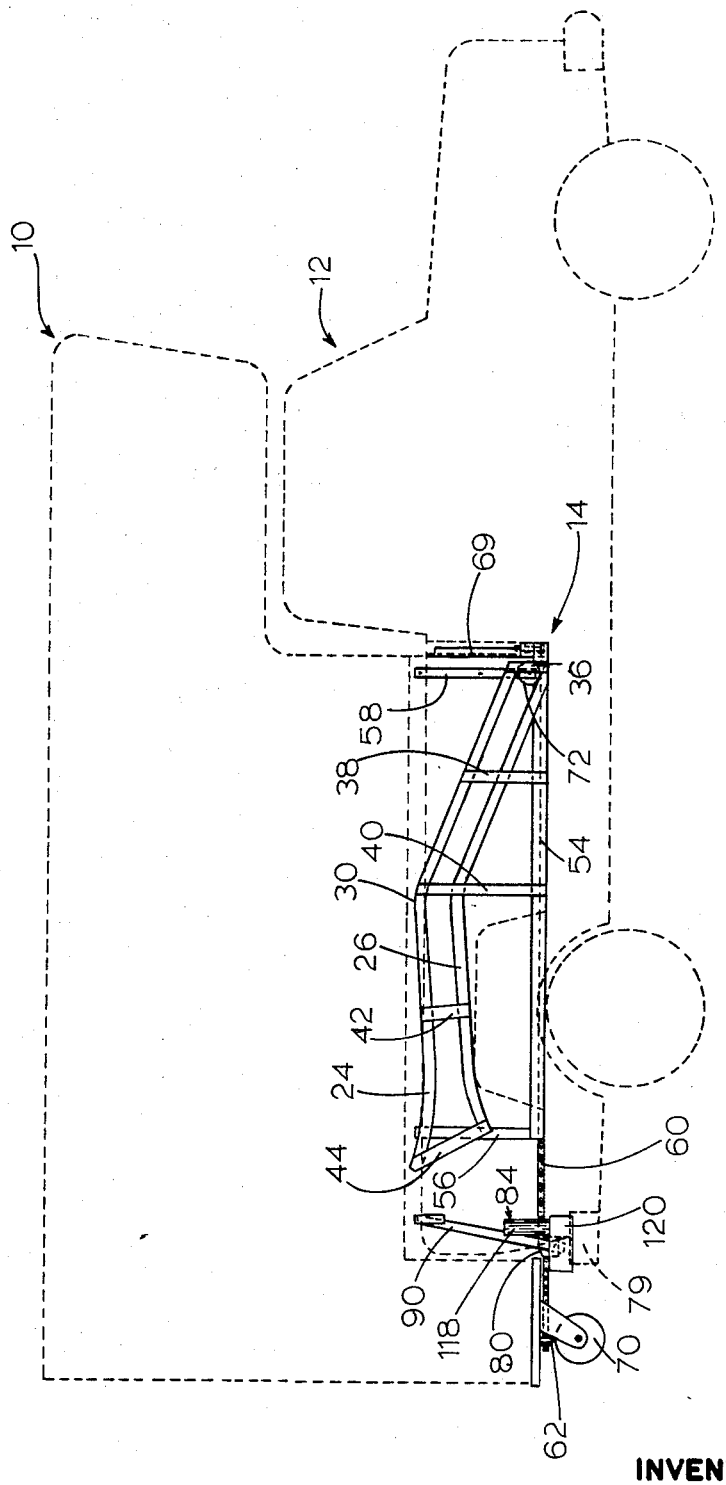
INVENTOR
GERALD P. YOUNGERS

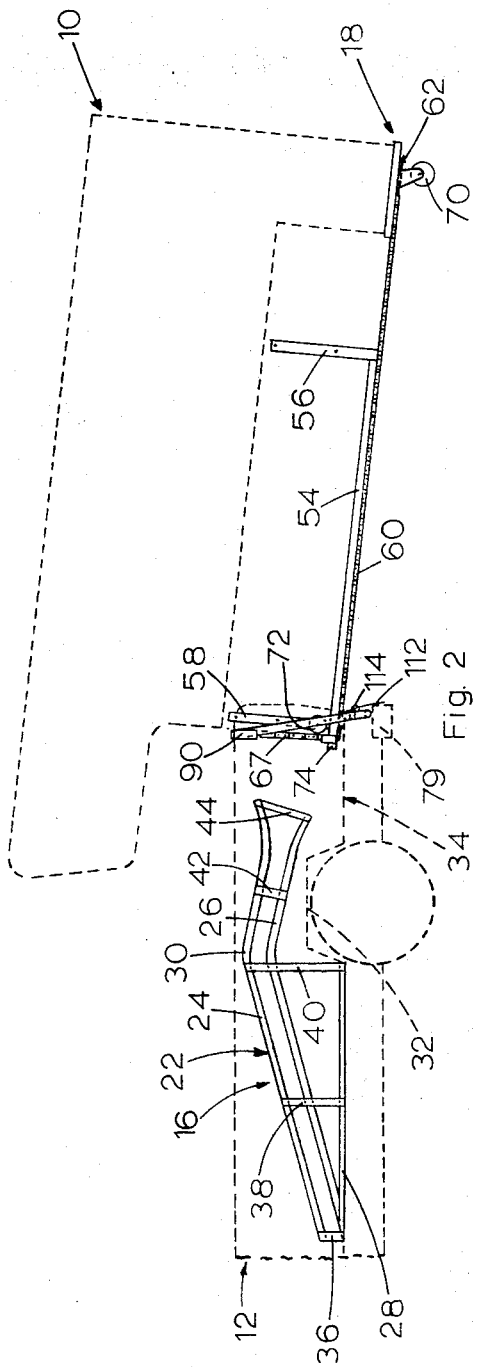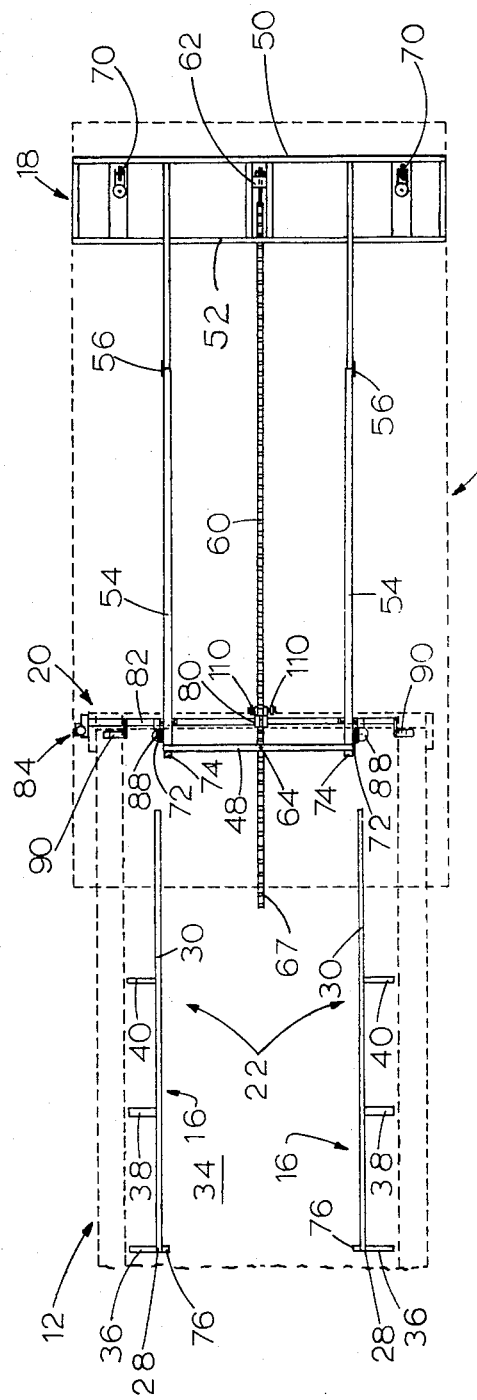

LOADER AND UNLOADER APPARATUS

Numerous camper handling devices are known in the prior art which are adapted to move campers from a storage position on the ground, on a rack or on other supports onto the bed of a pickup truck or other truck bed for their use; however, these prior art devices have several inherent disadvantages which make them undesirable. Generally, the prior art camper handling devices rely on the camper being stored in a raised position a substantial distance above the ground, either supported on an auxiliary frame or other supporting structure or on some extendable leg type structure attached to the camper and extendable when it is removed or to be removed. The prior art devices which rely on using the structure to support the camper in storage have the disadvantage of requiring additional structure to be mounted with the camper to attach the legs or having the legs directly mountable on the camper structure. In any event, the camper is stored at a relatively high position which is inherently unstable and is undesirable for safety reasons. The other camper handling devices store the camper low to the ground and rely on an auxiliary frame attached to the camper on which wheel or short leg assemblies are attached in order to support the camper when in the unloaded position. Normally, these types of devices require the use of two winch type devices or a single winch using two cables or the like to lift and move the structure from the storage position onto the truck bed so that it can be pushed to the loaded position. This dual winch type apparatus is generally not desirable because of the inherent complicated mechanical apparatus and the inconvenience of having two cables or the like to guide and keep from tangling.

In one preferred specific embodiment of the camper loading and unloading apparatus of this invention, a device is provided having a guiding frame attachable to a truck bed adapted to engage a second frame apparatus mountable on the underneath side of a camper or the like having a winch apparatus with a winch block mountable on the rear bed portion of the truck to engage and move a chain that is secured to the second frame and positioned underneath the camper. The guiding frame has a pair of spaced rails forming a track which is mounted on each side of the truck bed extending upward and rearward from the forward portion of the truck bed. The second frame has forward and aft members secured to the camper structure supporting between them the chain and having elongated members on the side of the frame structure connecting the forward and aft transverse members on the lower edge portion of the camper. The winch apparatus has a winch block and plurality of rollers securable to the rear of the truck bed, with the winch block positioned in alignment with the chain and having a passageway therethrough to pass the chain and its second frame connecting member. The winch block has a sprocket rotatably mounted therein to be turned by the powering device which is connected to it by a shaft.

In operation the camper loading and unloading apparatus of this invention is adapted to load a camper onto a truck bed from a storage position on the ground by using the winch to pull the chain and raise the forward end of the camper onto the rear of the truck bed into contact with the rollers and further use the chain to move the camper forward through the guiding and supporting frames to a loaded position on the truck bed.

The camper loading and unloading apparatus also is adapted to remove the camper from the truck bed via the winch apparatus and to place it directly behind the truck in a storage position which is close to the ground.

One object of the camper loader and unloader apparatus of this invention is to overcome the aforementioned disadvantages of the prior art devices.

Another object of the camper loader/unloader apparatus of this invention is to provide a device to load and unload campers or like objects which has a winch assembly and a winch block secured to the truck and adapted to pass a chain, rope, or the like which is secured to the camper thereby loading and unloading the camper.

Yet another object of the camper loader and unloader apparatus of this invention is to provide a camper loading and unloading device having a frame attached to a truck bed to engage another frame that is attached to a camper and is used to guide the camper onto the truck bed to a loaded position and secure it to the truck bed.

Still, another object of the camper loader and unloader apparatus of this invention is to provide a camper loading and unloading device usable with a truck having a winch assembly with a winch block that is secured to the truck bed to be positioned underneath the camper and which has a sprocket therein rotated by a powering device and having a passageway therein to pass and move a chain attached to a camper to load and unload the camper.

Various other objects, advantages, and features of the invention will become apparent to those skilled in the art from the following discussion, taken in conjunction with the accompanying drawings, in which:

FIG. 1 is a side elevation view of a pickup and camper shown in dashed lines in the loaded position with the camper loader and unloader apparatus of the invention shown in solid lines;

FIG. 2 is a side elevation view of a camper and rear portion of a pickup truck shown in dashed lines, having the camper loading and unloading apparatus shown in solid lines with the camper positioned on the rear portion of a truck bed with the forward end of the camper frame just ahead of the winch assembly;

FIG. 3 is a top plan view of the camper loader and unloader apparatus as shown and positioned in FIG. 2;

Figure 4:
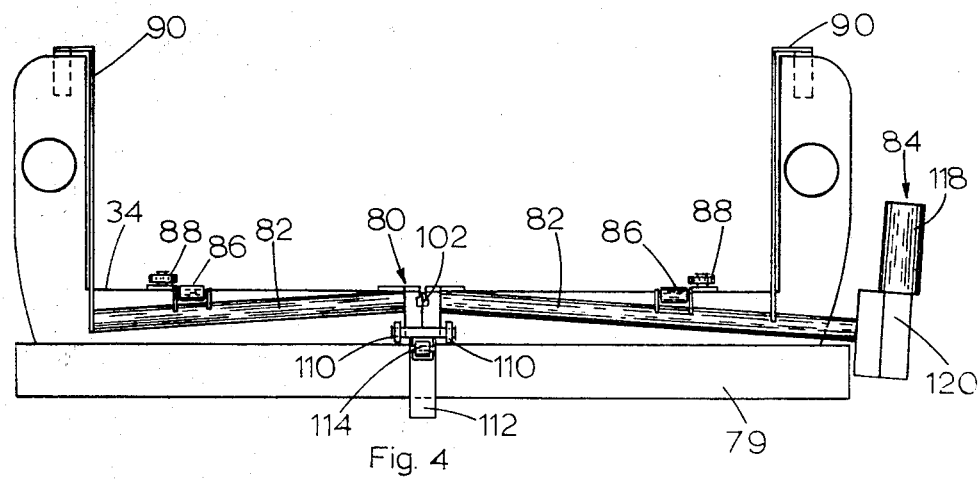
FIG. 4 is a rear end elevation view of the pickup truck with the camper removed showing the winch apparatus.

The following is a discussion and description of preferred specific embodiments of the camper loader and unloader apparatus of this invention, such being made with reference to the draings, whereupon the same reference numerals are used to indicate the same or similar parts and/or structure. It is to be understood that such discussion and description is not to unduly limit the scope of the invention.

Referring to the drawings generally and in particular to FIG. 1, such shows the camper loader and unloader apparatus of this invention with a camper, generally indicated at 10, loaded on a pickup truck, generally indicated at 12, connected by the camper loader and unloader apparatus of this invention, generally indicated at 14. Components of the camper loader and unloader apparatus 14 are best seen in FIGS. 2 and 3. The camper loader and unloader apparatus 14 has a truck mounted frame assembly 16 which is mounted in the bed portion of the pickup truck, a camper frame assembly 18 to be mounted on the lower portion of a camper, and a winch assembly 20 to be mounted on the rear end portion of the truck bed.

The truck mounted frame assembly 16 has a pair of guiding tracks 22 with one positioned on each side of the truck bed spaced slightly wider than the inserting lower portion of the camper. Each of the guide tracks 22 has an upper rail member 24 and lower rail member 26 both of which are secured at the forward end of the guide track, as indicated at 28, and extend in a straight relation to an apex 30 above and just ahead of the truck's wheel wells 32 and extend rearwardly therefrom a substantial distance to the rear end portion of the truck bed 34. The guide rails 24 and 26 are supported at various places along the length by vertically disposed members to hold them in their proper spaced relation.

The guide rails 24 and 26 are supported on their forward end by a vertical member 36, in the center portion of a straight span by another vertical member 38, in the apex portion 30 by another vertical member 40, and they are connected in the aft portion by connecting members 42 and 44. Mounting of the guide rails 24 and 26 can be seen in FIG. 2 and FIG. 3. It is to be noted that the rear end of the guide rails is divergent slightly so that the rearmost supporting member 44 spans a substantially wider gap than the other supporting members. The three forwardmost guide track supporting members 36, 38 and 40, are secured on their lower portion to the truck bed 34 and function to hold the guide tracks 22 in their proper upright position.

The camper frame assembly 18 is best described in conjunction with FIGS. 2 and 3 where it is shown with the forward end portion thereof slightly ahead of the winch assembly 20. The camper frame assembly 18 includes a forward member 48 secured to the lower forward edge of the camper, an aft member 50 secured to the lower rear edge portion of the camper and having a box-like structure attached to the lower rear portion of the camper with a forward box member 52. Elongated members 54 are secured to the lower side edge portions of the camper and connecting the forward and aft members 48 and 50 and 52. The camper frame assembly 18 is adapted to be mounted on the lower edge portion of the camper which is normally adapted to contact a pickup truck bed. The camper shown in the drawings is one with an indented center portion adapted to fit between the wheel wells of a conventional pickup; however, it should be understood the camper loader and unloader apparatus 14 of this invention is not to be restricted to this type of camper/truck combination configuration alone.

The elongated side members 54 of the camper frame assembly 18 have vertical mount members 58 on the forward ends thereof and rear upright mount members 56 on the rear thereof to secure the camper frame 18 to the camper body as can be seen in FIG. 2. The camper 10 is preferably positively secured to the camper frame assembly 18. Between the forward and aft camper frame assembly members, 48 and 50, a connector member or chain 60 is mounted as can be seen in FIG. 3. The chain 60 is preferably secured to the aft portion of the camper frame assembly as indicated at 62 and running in a longitudinal relation to the camper along its center line and secured at the forward member 48 by a chain attaching member 64 which can be seen in FIG. 6. The chain 60 is preferably a roller cahin that is laterally flexible; it can be seen in FIG. 5 in normal position, the rollers thereof horizontally oriented relative to the camper. In practice of this invention a chain which is a product of Rex Chainbelt Inc., called a SIDE-BOW roller chain, has been found very satisfactory. The chain attaching member 64 is an elongated member which on its lower end replaces one of the rollers in a chain link and extends upward through the forward camper frame member 48 as can be seen clearly in FIG. 6. The chain attaching member extends through the forward camper frame member 48 and is threaded on the upper portion fitted with a nut 66 to allow vertical movement of the chain attaching member 64 in its aperture in the frame member 48. The aft chain attachment 62 is preferably adjustable so as to adjust the tension of the chain 60. The chain 60 is substantially longer than the length of the camper and has a length of unattached chain extending from the chain attaching member 64 which is necessary because it is fitted into the winch assembly as will be described in the hereinafter.

It is to be noted that the winch of this invention is preferably constructed to operate with a chain; however, it can be constructed to operate with a rope, cable or the like and perform the same operation and function in a similar manner. The disclosure of a chain used with the winch of this invention is to be understood as not unduly limiting the scope of the camper loader and unloader apparatus of this invention.

A chain storage rack 68 is provided for storage of the additional length of unattached chain 67 emanating from the chain attaching member 64. The storage rack 68 is a curved member visible in FIG. 6 connected between the center portion of the camper frame member 48 and a vertical member 69. This rack 68 allows the chain 67 to be turned and laid in it once the chain attaching member 64 has passed through the winch assembly 20. The rack 68 is preferably a curved piece of angle like material or the like which will allow the chain 67 to be easily laid into it and will retain it there for storage. It is to be noted that the chain attaching member 64 does not interfere with the flexible motion of the chain; it is merely a replacement of one roller by a vertical member freely rotatable in the chain assembly and used to hold the chain in the proper position on the bottom of the camper frame assembly 18. Side-bow roller chain is preferred for use in the camper loader and unloader 14 since it has a great amount of lateral flexibility and substantial tensile strength.

To aid in moving the camper in either the loading or unloading operation, a pair of pivotable type wheels 70 are attached to the bottom of the camper frame 18 on its rear end portion, as can be seen in the drawings. These wheels support the rear of the camper above the ground and assist alignment and movement of the camper in loading or unloading. Additionally, to aid in easy forward movement of the camper along the guide tracks 22, a pair of rollers 72 are attached to the outside of the forward vertical frame members 58 with the wheels mounted so as to roll in the lower guide tracks 22. The rollers 72 for the guide tracks can be seen in FIG. 6.

When the camper 10 is in the loaded position on the truck 12, the rear end of the camper frame 18 is held in position by the chain 60 being engaged in the winch assembly 20, and on the forward portion thereof it is secured by the camper frame assembly 18 being engaged in a locking apparatus on the forward end of the truck mounted frame 16. The camper frame assembly 18 has a pair of extended locking members 74 extending forwardly from the elongated side frame members 54 as can be seen clearly in FIG. 3. The truck mounted frame 16 has a pair of inwardly extending locking members 76 positioned at the forward end 28 of the truck mounted frame 16. When the camper 10 is moved into the loaded position, the camper locking members 74 extend underneath the truck frame locking members 76 thereby preventing upward movement of the forward end of the camper 10 so long as it is in the loaded position.

Figure 5:
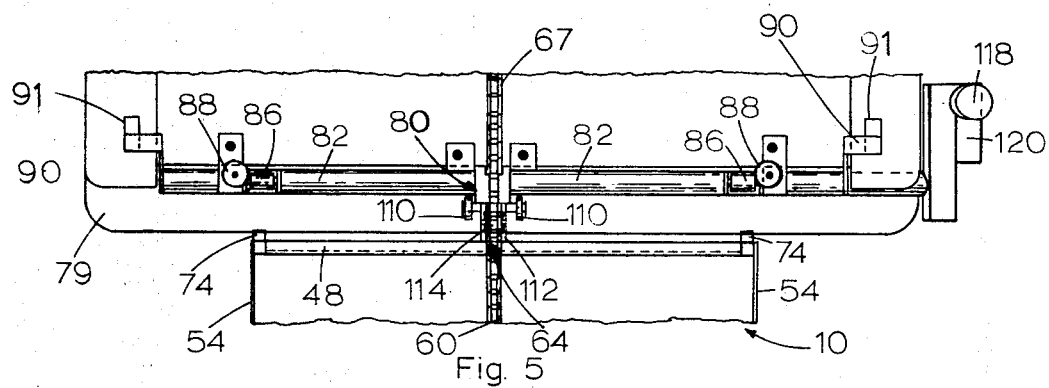
FIG. 5 is a top view of the rear bed portion of the truck and the forward end portion of the camper positioned with the camper immediately aft of the winch block assembly.
Figure 6:
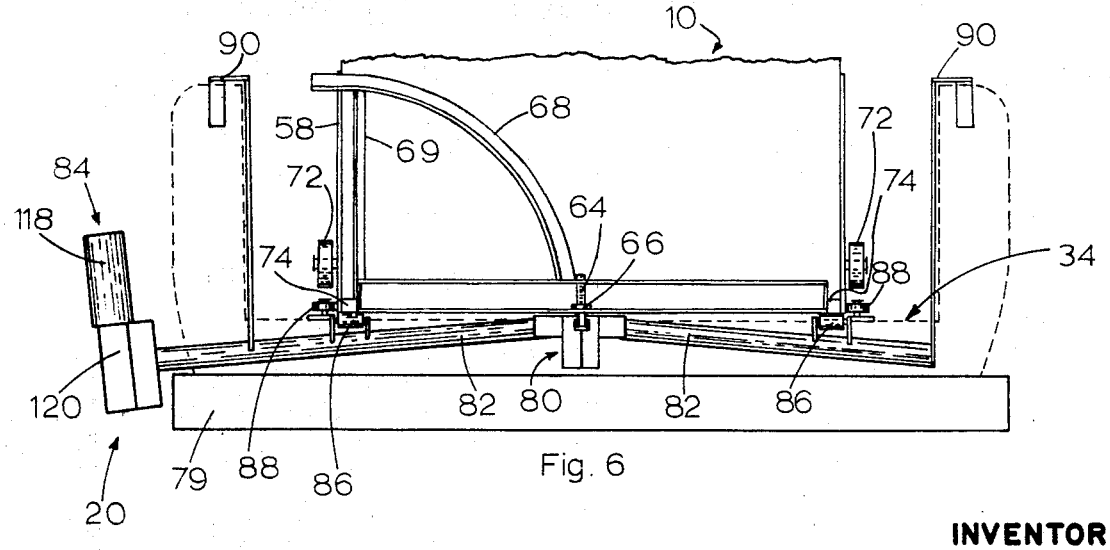
FIG. 6 is a cross-sectional view of the truck bed taken just ahead of the winch block assembly, looking aft with the camper positioned at the winch block assembly showing the chain attaching member in the winch block passageway.

The winch apparatus 20 is preferably mounted immediately behind the truck bed 34 above the bumper 79 and substantially contained between the upright fenders of the pickup truck as can be seen clearly in FIGS. 4, 5 and 6. The winch apparatus 20 includes a winch block 80 supported between conduit members 82 which extend to the outer portions of the truck, a powering device 84 to operate the winch, and a plurality of rollers adapted to engage the elongated side members 54 of the camper frame assembly 18. The conduit members 82 are supported by upright fender engaging members 90 as can be seen in FIG. 6. The fender engaging members extend vertically alongside the inner portion of the pickup bed area and are hooked in the usually existing side board mounting apertures 91 common to most conventional type pickups. The plurality of rollers has a horizontally oriented roller 86 on each side of the winch assembly and an adjacent vertically oriented roller 88 which in operation contact the bottom and the side of the elongated camper frame member 54 to guide it into the truck bed. These roller assemblies are supported above the conduit members 82 and are supported from the truck bed for stability. The powering device 84 consists of a motor and a gear box supported on one of the conduit members 82 and having a shaft extending inwardly through the conduit members to a sprocket in the winch block 80.

Figure 7:
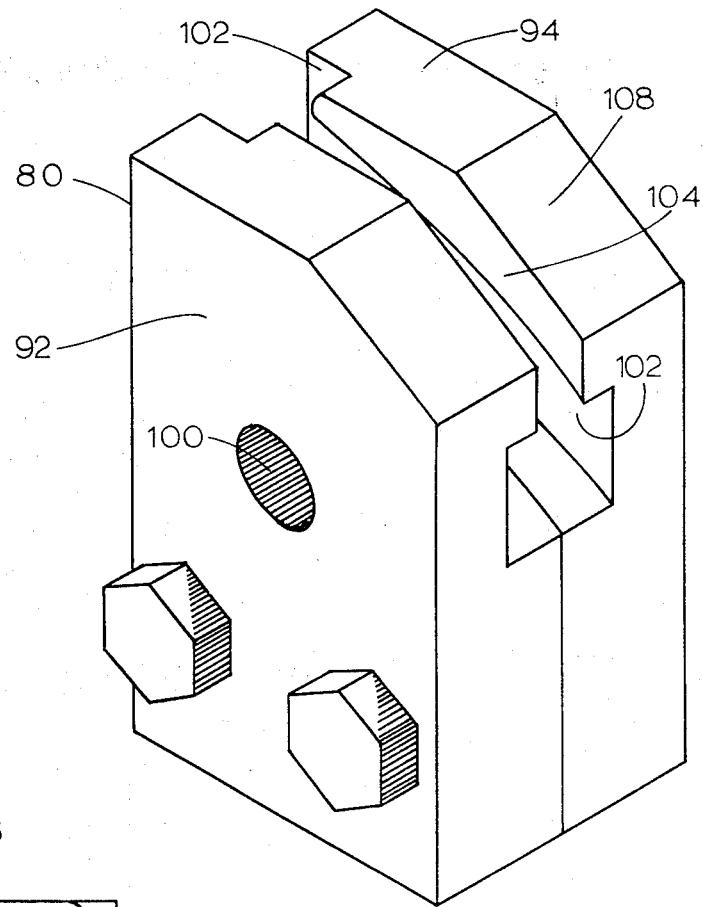
FIG. 7 is an enlarged perspective view of the winch block alone taken from above and from the normally rearward side thereof.
Figure 8:
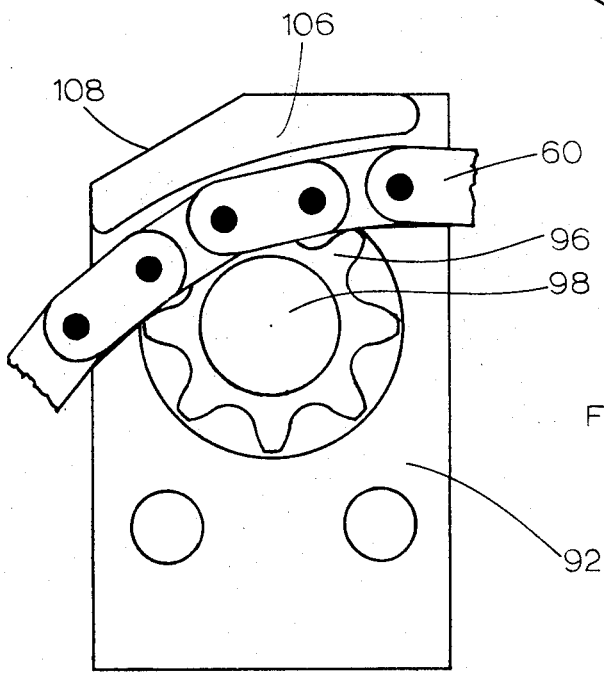
FIG. 8 is an elevation view of one-half of the winch block assembly having a chain segment and the sprocket therein in the operation position.

The winch block 80 is shown in detail in FIGS. 7 and 8, and is comprised in two connecting portions. The winch block 80 has a sprocket 96 rotatably mounted therein connected to a shaft 98 which supports the sprocket through holes 100 in the sides of each winch block half, 92 or 94. One passageway 102 extends through the upper portion of winch block as can be seen in the drawings; the passageway which is adapted to pass the chain and an additional passageway 104 is provided above the chain passageway 102 between the upper portion 106. The specific shape of the chain passageway 102 is visible in FIG. 8 as is the other passageway 104. The upper passageway 104 is adapted to pass the chain attaching member 64 and is necessarily narrower in width than the chain passageway 102 to allow only the chain attaching member 64 to pass through it while retaining the chain 60 in the chain passageway 102 below. The winch block 80 is provided with an inclined surface 108 on the upper rear portion thereof. This inclined surface 108 is adapted to be positioned rearward relative to the truck 12 so as to give an inclined surface on which the forward camper frame member 48 will move onto. As can be seen in the drawings, the winch block 80 is constructed in two mirror-image or matching portions which are bolted together; these portions are preferably welded to the conduit support members 82 to hold the winch block in the proper rigid relation on the back of the truck bed 34. With the winch block 80 bolted together, it allows the structure to be opened as necessary for inspection or service.

Immediately adjacent to the rear surface of the winch block 80, a pair of rollers 110 and a chain slide member 112 are provided as a guide for the chain 60 and as a brace for the forward camper member 48 as it is moved behind the winch block 80. The chain guide 112 is provided with a chain roller 114 positioned in its upper center portion of it to properly position the chain relative to the entrance to the passageway 102 in the winch block. The rollers and chain guide, 110 and 112, are not in use except when the camper is positioned immediately behind the winch block 80 as is the case when it is being raised or lowered. At such time the forward camper frame meber 48 will engage the rollers 86 and 88 on the winch assembly 20. As a practical matter in practice it has been found that the rollers and chain guide ease the load on the powering device 84 in the lifting operation of the camper.

Movement of the chain 60 through the winch block 80 is accomplished by feeding the end portion of the unattached chain 67 into the passageway 102 of the winch block and rotating the sprocket 96 by use of the powering device 84. Preferably the powering device 84 has an electrical motor 118 connected to a gear box 120 and mounted on the outer end of one winch assembly conduit member 82, as shown. The electric motor 118 is preferably operable from the electrical system of the truck vehicle by a switching apparatus which is not shown in the drawings but has the capability of operating the electric motor 118 to rotate in either direction. By necessity, the electric motor 118 and gear box 120 must rotate in either direction in order to move the chain 60 through the winch block 80 in either direction as such is necessary to load and unload the camper. In practice it has been found convenient to connect the electric motor 118 to the electrical system of the truck 12 and have an extension control cord with switches thereon to turn the electric motor on and off and to control its direction of rotation. With the extension control cord connected to the powering device 84, it enables one person to load or unload the camper and walk alongside it and around it to observe during operation loading or unloading of the camper.

It is to be noted that a powering device using an electric motor is shown in the herein preferred specific embodiment of this invention; however, it is to be understood thasuch powering device can be replaced by a hand operable winch apparatus and function similarly.

In the preferred operation of the camper loading and unloading apparatus 14 of this invention when used to load a camper onto the truck, the truck is first backed into position ahead of the forward end of the camper. The camper can then be loaded directly from its storage position resting on the ground by use of the herein-described invention. The appartaus of this invention 14 enables the camper to rest close to the ground supported above the ground by the wheels 70 on the rear portion of the camper frame 18 and on the forward end by a supporting block used to maintain the camper in a level position when in storage. The forward support block is not shown in the drawings because it can be virtually any type of block, brick, or whatever placed under the forward portion of the camper when it is unloaded to position the forward portion of the camper frame assembly will be slightly above the ground preferably at a height approximating that of the rear of the camper. It is to be noted that the camper loading and unloading apparatus 14 of this invention will operate to pick the camper up directly from the ground if the forward portion of the camper frame assembly is resting on the ground; however, it has been found that this gets the forward portion of the camper quite dirty if it is stored resting directly on the ground.

When the truck 12 is backed into position at the forward end of the camper 10, it need be only generally aligned with the camper 10. The unattached length of chain 67 stored on the forward portion of the camper frame assembly 18 in the storage rack 68 is removed and inserted into the winch block 80, and the powering device 84 is then brought into operation thereby moving that length of chain through the winch block 80. As the unattached length of chain 67 moves through the winch block 80, it picks up the forward end of the camper; this allows the rear wheels 70 to move the camper into direct alignment with the rear of the pickup bed and the rollers 72 into alignment with the guide tracks 22 inside the truck bed. FIG. 5 shows the relative position of the camper 10 and the back of the truck 12 as the camper 10 is lifted into position immediately before the forward portion of the camper passes over the winch block 80. When the camper is being lifted to this position, the chain 67 moves along the chain guide 112 and over the roller 114 as described above. Just as the forward member of the camper frame assembly 48 reaches the winch block 80, it rolls over the rollers 110 thereby lifting it onto the inclined surface 108 of the winch block whereupon the chain attaching member 64 passes through the winch block 80 in its upper passageway 104, and simultaneously the forward portion of the camper frame assembly 18 contacts the rollers 86 and 88 thereby resting the front end of the camper 10 on the truck bed 34 in a smooth operation. Once the forward end of the camper 10 is on the truck bed, it is essentially in the position as shown in FIGS. 2 and 3 of the drawings. From this point on, continued operation of the powering device moves the chain 60 which is underneath the camper through the winch block 80 thereby moving the camper 10 onto the truck bed. As the camper 10 moves forward the front end of the camper 10 rises vertically as the rear end thereof moves forward and the elongated frame members 54 move over the rollers 86 and 88. When the forward end of the camper raises, the guide wheels 72 move between the upper and lower rails 24 and 26 of the guide track 22 and roll along one or the other of the rails as the camper moves forward; this guides the camper into the proper relation and spacing in the truck bed area so as to maintain the winch assembly 20 in contact with the bottom of the camper frame assembly 18 at all times.

The divergent portion of the guide tracks 22 on the rearward end thereof is for the purpose of enabling the camper to be loaded on ground which is not level. Loading the camper 10 on unlevel ground will cause the forward end of the camper to be either higher or lower than it would if it were loaded on level ground, when the forward portion of the camper is to the point where it would engage the guide tracks 22. Preferably the camper will move forward with the guide wheels rolling on the lower guide rail 26; however, the upper guide rail 24 is provided as a safety feature in the event the camper should be for some reason be tipped rearward thereby raising its forward end.

Soon after the forward portion of the camper moves onto the truck bed, the unattached length of chain 67 can be turned and placed in the storage rack 68. As the camper 10 moves into the extreme forward portion of the truck bed, the forward extending locking members 74 on the camper frame assembly 18 move underneath the inwardly extending locking members 76 on the forward end of the guide tracks; this locks the forward end of the camper to the truck bed 34. When the camper is in the loaded position, it is in the position shown in FIG. 1 of the drawings. During the loading operation it is to be noted that the remote extension control cord for the powering device 84 enables one person to load the camper during the loading operation, walk around the camper to observe it being loaded. In practice the remote control has been found very helpful when loading the camper in a high side wind condition or when the camper is not particularly well aligned with the truck; in such instance the person operating the camper can push the rear of the camper from side to side or hold it so that it aligns properly with the guide tracks as the loading operation progresses.

In the unloading operation of a camper using the camper loading and unloading apparatus 14 of this invention, the procedure described in the preceding paragraph is essentially reversed. When the powering device 84 is operated in the reverse direction, the chain is moved in a rearward direction through the winch block 80; this moves the camper rearward along the guide tracks 22 upward and rearward so as to lower the rear portion of the camper to the ground whereupon the wheels 70 contact the ground and allow the camper to move rearward. The truck during unloading of the camper can either be still or can move forward at a slow rate. The camper 10 is automatically unlocked from the truck bed 34 as the camper frame assembly 18 is moved rearward. The remote extension control for the powering device allows an operator to move around and supervise the unloading easily. As the camper moves into the approximate position shown in FIGS. 2 and 3 when in the unloading operation, the unattached length of chain 67 should be removed from the storage rack 68 on the forward portion of the camper frame assembly and laid in the center portion of the truck bed 34 so that as the chain attaching member 64 will move rearward through the winch block 80 and the chain will easily follow. When the chain attaching member 64 has moved through the winch block 80 in the rearward direction, the chain portion 67 holds the camper 10 as described in the loading operation and similarly lowers it to the ground. Prior to the front portion of the camper frame assembly 18 contacting the ground, it has been found in practice advisable to insert one or two blocks of some sort underneath the forward portion of the camper frame assembly 18 which are of sufficient size to support it in approximately a level relation. Once the camper is resting on the ground and the unattached length of chain 67 has been fed from the winch apparatus 20, that length of chain can be stored in the rack 68.

In the manufacture of the camper loading and unloading apparatus 14 of this invention, it is obvious that the frame thereof can be constructed of sufficient size to safely support, load and unload a camper which is loaded with the various paraphernalia people normally take camping. Additionally, it is obvious that the structure of the camper loading and unloading apparatus 14 of this invention can be constructed and adapted to fit various makes and models of campers which slide into or onto truck beds because of their basic similarities in order to achieve the end product.

In the use and operation of the camper loading and unloading apparatus 14 of this invention it is seen that same provides a device which allows one person to load and unload a camper from a truck in a minimum of time and with a minimal expenditure of effort. The camper loader and unloader structure 14 of this invention is constructed so as to prevent undue tipping or shaking motion of the camper 10 as it is being loaded onto a truck and lock the camper 10 on a truck in a loaded position. Also, the camper loader and unloader apparatus 14 of this invention is provided with an electric motor powering device 84 adapted to be operated from the electrical system of the truck on which the camper is loaded.

As will be apparent from the foregoing description of the applicant's camper loader and unloader apparatus, relatively inexpensive means have been provided to load and unload a camper on a truck which can be accomplished by one person. The camper loader and unloader apparatus structure is economical to manufacture, easily attached to the popular and conventional style of slide-in camper, simple to use, and is adapted to move a camper from a storage position on the ground to the loaded position on the truck in a minimum of time and with a minimum of effort.

While the invention has been described in conjunction with preferred specific embodiments thereof, it will be understood that this description is intended to illustrate and not to limit the scope of the invention, which is defined by the following claims.

I claim:
1. A loading and unloading apparatus, comprising:
   a. a first frame means permanently mountable on the lower portion of a box-like structure,
   b. a connector member secured to the forward and rear portions of said first frame means and extending therealong,
   c. a frame means mountable on a vehicle bed and enagable with said first frame means, said frame means having means to guide said first frame means onto said vehicle bed,
   d. a winch means attachable to said vehicle bed at the rear end portion thereof and having a winch block means,
   e. a powering means having means to engage said connector member to in operation move said first frame means relative said second frame means forward and backward,
   f. said first frame means has means on the forward end thereof to engage said second frame means guide means,
   g. said second frame means to guide said first frame means is a track means extending rearward from the forward portion of said vehicle bed and a roller means at the rear of said vehicle bed to engage said first frame means in vertical and horizontal planes for guiding and ease of movement,
   h. said connector member has an extended portion continuous with said secured portion and extending from one end of said box-like structure, and
   i. said winch block means has means to pass said extended portion of said connector member while said same is secured to said first frame means.

2. The loading and unloading apparatus as described in claim 1, wherein:
   a. said first frame means has transverse members on the forward and aft ends thereof mountable at the forward and aft end portion of said box-like structure and elongated members on the sides thereof connecting said forward and aft members mountable on the sides of said box-like structure,
   b. said track means has a pair of rail members mounted in a a spaced relation extending rearwardly to an apex and downwardly therefrom and from said forward end portion of said vehicle bed to the rear end portion thereof,
   c. said means to pass said connector member is a friction means and a passageway therein said winch block means to engage said connector member to pass said secured portion thereof and said extended portion thereof, and
   d. said roller means has a plurality of rollers secured to said winch frame means to engage said first frame means at said forward member and said elongated members.

3. The loading and unloading apparatus as described in claim 2, wherein:
   a. said first frame forward member has an attaching member mounted thereon in a loose fashion to support said connector member and to pass with same through said winch block passageway,
   b. said second frame means has a locking means on the forward end portion thereof engagable with said first frame means to hold same in place on said vehicle bed when said first frame means is in a loaded position.
   c. said rail members extend in an upward direction from the forward ends thereof to the center portion of said vehicle and in a downward direction from said center portion to the rear portion of said vehicle bed, and
   d. said loading and unloading apparatus has one of said track means on each side of said vehicle bed.

4. The loading and unloading apparatus as described in claim 3, wherein:
   a. said winch block means is secured to said winch frame means, b. said friction means is a sprocket rotatably mounted in said winch block means having a portion thereof extending into said passageway so as to engage said connector member and move same,
c. said passageway has a lower passageway extending through said winch block means and an upper passageway adjacent to said lower passageway which is open on its upper surface to the upper surface of said winch block means to pass said attaching member, and
d. said powering means is connected to said sprocket by a shaft,
e. said connector member is a roller chain,
f. said first frame means has a ground engaging wheel on said aft portion thereof contractable with the ground when said first frame means is not in said loaded condition,
g. said locking means has a forwardly extending member on said first frame means engagable with a transversely extending member on said second frame means, and
h. said first frame means having rollers extended laterally from said box-like structure engagable with said rail members for ease of loading and unloading said box-like structure.

5. A winch means in combination with a box-like structure loading and unloading apparatus having a guide means attached to a vehicle bed, and a frame mountable on said box-like structure adapted to be engaged with said guide means, to load and unload same, comprising:
a. a connector member secured to the forward and aft portions of said frame means, extending thereunder same,
b. a winch block means securable to said vehicle bed,
c. powering means to engage said connector member to in operation load said box-like structure into said vehicle bed and moving said guide means into engagement,
d. said connector member is secured in one portion to said frame means, and has an extended portion continuous therewith, extending from one end of same and secured thereto by a semi-flexible attaching member,
e. said winch block means has means to pass said secured portion and said extended portion of said connector member,
f. said winch means has a frame means mounting said winch block means,
g. said means to pass said conductor member is a friction means and a passageway therein said winch block means to engage and move said connector member,
h. said powering means is connected to said friction means,
i. said winch block passageway has a lower passageway portion therethrough to pass said connector member and an upper passageway portion open on its upper portion adapted to pass said chain attaching member, and
j. said friction member is a sprocket rotatably mounted in said winch block means and having a portion thereof extending into said lower passageway.

6. The combination of a truck bed having a camper guiding and mounting frame means, a camper having a frame means on the lower portion thereof engagable with said camper guiding and mounting frame means on said truck bed, and a winch appartaus having a winch block powering means mounted on said truck bed and a chain secured to said camper frame means, wherein the combination comprises:
a. said camper guiding means secured to said truck bed having from the forward end thereof a rearwardly extending track having a centrally raised apex with a pair of spaced rail-like members, and having a roller means secured to the rear portion of said truck bed to engage said camper frame means in vertical and horizontal planes for ease of movement and centering in said truck bed,
b. said camper frame means secured to the underneath side of said camper having transverse members on the forward and aft end portions thereof, with longitudinal members on the side portion thereof, roller members secured to said side portions thereof engagable with said truck for guiding movement, and with a chain secured on the bottom thereof extending substantially the lenth thereof,
c. said winch apparatus having said winch block and said powering means mounted on the rear end portion of said truck bed, said winch block positioned to align with said chain, said winch block having a sprocket rotatably mounted therein and passageways therethrough to receive and pass said chain, said powering means operably connected to said sprocket to rotate same.

* * * * *

UNITED STATES PATENT OFFICE
CERTIFICATE OF CORRECTION

Patent No. 3,768,678                  Dated   October 30, 1973

Inventor(s)  Gerald P. Youngers

It is certified that error appears in the above-identified patent and that said Letters Patent are hereby corrected as shown below:

In the Abstract, line 6, "caloe" should read -- cable --.

Column 1, line 40, after "like" insert -- and --;

line 54, after "rear" insert -- end --.

Column 2, line 50, after "top" insert -- plan --;

line 64, "operation" should read -- operating --.

Column 3, line 1, "draings" should read -- drawings --;

line 41, after "end" insert -- portion --

Column 4, line 17, "cahin" should read -- chain --.

Column 5, line 58, "members" should read -- member --;

line 64, "or" should read -- and --.

Column 6, line 35, "meber" should read -- member --.

Column 7, line 1, "thasuch" should read -- that such --.

Claim 1, paragraph (c), line 2, "enagable" should read

-- engagable --.

Claim 3, paragraph (c), line 3, after "vehicle" insert -- bed --.

Claim 5, line 3, after "frame" insert -- means --;

paragraph (g), line 1, "conductor" should read

-- connector --.

UNITED STATES PATENT OFFICE
CERTIFICATE OF CORRECTION

Page 2

Patent No. 3,768,678  Dated October 30, 1973

Inventor(s) Gerald P. Youngers

It is certified that error appears in the above-identified patent and that said Letters Patent are hereby corrected as shown below:

Claim 6, paragraph (b), line 8, "lenth" should read -- length --.

Signed and sealed this 30th day of April 1974.

(SEAL)
Attest:

EDWARD M. FLETCHER, JR.
Attesting Officer

C. MARSHALL DANN
Commissioner of Patents